United States Patent [19]
Thatcher et al.

[11] Patent Number: 6,079,002
[45] Date of Patent: Jun. 20, 2000

[54] DYNAMIC EXPANSION OF EXECUTION PIPELINE STAGES

[75] Inventors: Larry Edward Thatcher; John Stephen Muhich; Steven Wayne White, all of Austin; Troy Neal Hicks, Round Rock, all of Tex.

[73] Assignee: International Business Machines Corporation, Armonk, N.Y.

[21] Appl. No.: 08/935,573

[22] Filed: Sep. 23, 1997

[51] Int. Cl.[7] .................................................... G06F 12/00
[52] U.S. Cl. ............................ 711/169; 711/118; 711/141
[58] Field of Search ................................... 711/141, 142, 711/143, 118, 133, 122, 169

[56] References Cited

U.S. PATENT DOCUMENTS

| | | | |
|---|---|---|---|
| 4,905,188 | 2/1990 | Chuang et al. | 364/900 |
| 5,023,776 | 6/1991 | Gregor | 364/200 |
| 5,129,068 | 7/1992 | Watanabe et al. | 395/400 |
| 5,148,528 | 9/1992 | Fite et al. | 395/375 |
| 5,155,831 | 10/1992 | Emma et al. | |
| 5,185,878 | 2/1993 | Baror et al. | 395/425 |
| 5,333,296 | 7/1994 | Bouchard et al. | 711/171 |
| 5,404,482 | 4/1995 | Stamm et al. | 711/145 |
| 5,577,259 | 11/1996 | Alferness et al. | 395/800 |
| 5,644,752 | 7/1997 | Cohen et al. | 711/122 |
| 5,737,751 | 4/1998 | Patel et al. | 711/133 |
| 5,790,823 | 8/1998 | Puzak et al. | 712/207 |
| 5,809,530 | 9/1998 | Samra et al. | 711/140 |
| 5,832,297 | 11/1998 | Ramagopal et al. | 710/5 |
| 5,875,472 | 2/1999 | Bauman et al. | 711/150 |

*Primary Examiner*—John W. Cabeca
*Assistant Examiner*—Pierre-Michel Bataille
*Attorney, Agent, or Firm*—Sawyer Law Group LLP; Anthony V.S. England

[57] ABSTRACT

A method and system in a data processing system for accessing information using an instruction specifying a memory address is disclosed. The method and system comprises issuing the instruction to an execution unit and storing an address derived from the specified address. The method and system also includes accessing a cache to obtain the information, using the derived address and determining, in response to a signal indicating that there has been a cache miss, if there is a location available to store the specified address in a queue. According to the system and method disclosed herein, the present invention allows for dynamic pipeline expansion of a processor without splitting this function between components depending upon the reason expansion was required, thereby increasing overall system performance.

27 Claims, 3 Drawing Sheets

DYNAMIC EXPANSION OF EXECUTION PIPELINE STAGES

FIELD OF THE INVENTION

The present invention relates to a method and system for dynamically expanding the pipeline stages for execution of an instruction and more particularly to a method and system for dynamically expanding the stages of the pipeline during execution of the instruction to account for operations which require longer to execute.

BACKGROUND OF THE INVENTION

In the continuing development of faster and more powerful computer systems, reduced instruction set computer (RISC) processors have become commonplace. Increased advances in the field of RISC processors have led to the development of superscalar processors. Superscalar processors, as their name implies, perform functions not commonly found in traditional scalar microprocessors. Included in these functions are multiple execution units with out-of-order and speculative instruction execution.

In most superscalar processors, some classes of instructions may take a variable time to execute. In other words, when one of these instructions is to be executed, there may be no indication of the number of cycles required to complete execution. For example, executing a storage reference instruction includes three major steps: address generation, address translation, and cache access. These steps are executed through a pipeline. Although high end processors may achieve some overlap of these steps, there may still be difficulty in completing one or more of these operations. This is particularly true of address translations and cache accesses. Such difficulties will delay execution of the storage reference instruction, possibly causing the instruction to be executed over a larger number of cycles. However, it is desirable to optimize the hardware for the more frequent short execution cases, rather than burden all cases with the delay associated with the slowest cases.

A number of conventional systems fall into two categories. Some conventional systems are unable to account for differences in the time required to execute the steps of an instruction. These systems must be designed such that the longest instruction, no matter how infrequent, can always be executed. Other conventional systems can account for some expansion of the time required to execute an instruction. However, this function is split among multiple components which use the results of the portion of the instruction that has already been executed.

Accordingly, what is needed is a system and method for providing dynamic expansion of an instruction execution pipeline which does not split the function among components depending on the reason for the delay. The present invention addresses such a need.

SUMMARY OF THE INVENTION

A method and system in a data processing system for accessing information using an instruction specifing a memory address is disclosed. The method and system comprises issuing the instruction to an execution unit and storing an address derived from the specified address. The method and system also includes accessing a cache to obtain the information, using the derived address and determining, in response to a signal indicating that there has been a cache miss, if there is a location available to store the specified address in a queue.

According to the system and method disclosed herein, the present invention allows for dynamic pipeline expansion of a processor without splitting this function between components depending upon the reason expansion was required, thereby increasing overall system performance.

DETAILED DESCRIPTION OF THE INVENTION

The present invention relates to an improvement in superscalar processors. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Instructions for most modern processors, such as superscalar processors, could take a variable number of cycles to execute. Most instructions should often take a single cycle to execute. However, there may be no indication of the time actually required to complete execution. For example, executing a storage reference instruction includes three major steps: address generation, address translation, and cache access. These steps are executed through a pipeline and normally take a single cycle to execute. Difficulty in completing one or more of these steps may be encountered, particularly for address translations and cache accesses. Consequently, completion of the entire instruction may also be delayed.

Figure 1:
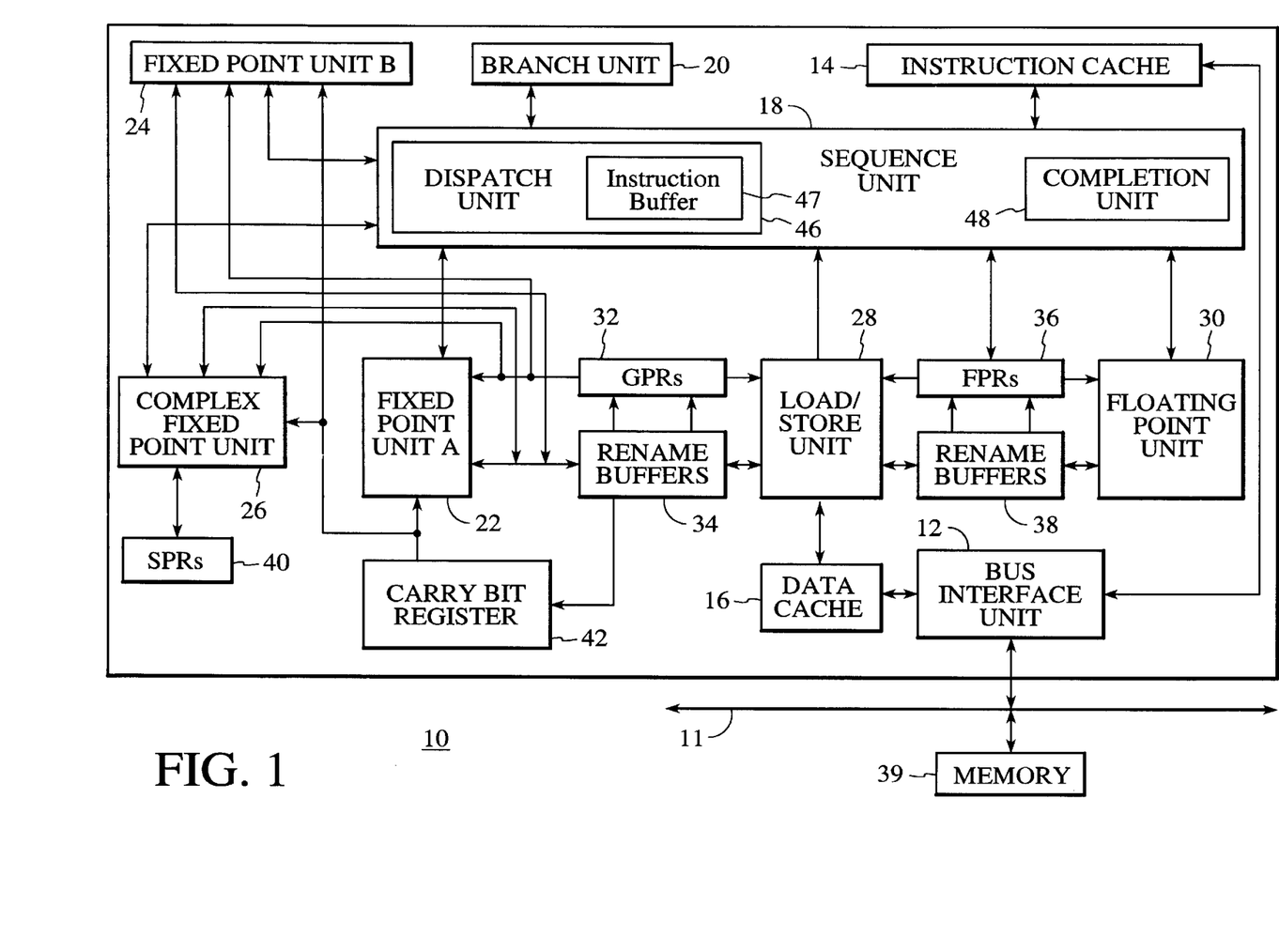
FIG. 1 illustrates a block diagram of a computer system in accordance with the present invention.

FIG. 1 is a block diagram of a processor system 10 for processing information in accordance with the present invention. In the preferred embodiment, processor 10 is a single integrated circuit superscalar microprocessor, such as a PowerPC® processor from IBM Corporation, Austin, TX. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. The instruction cache 14 in turn is coupled to the instruction buffer 47. In response to such instructions from instruction cache 14, sequencer unit 18 selectively outputs instructions via instruction buffer 47 to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11. The dispatch unit 46 includes an instruction buffer 47 for storing the instructions. Instructions are transferred by the sequencer unit 18 from instruction cache 14 to instruction buffer 47 after being compressed as needed.

In response to the instructions input from instruction buffer 47, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed as six stages, namely fetch, decode, dispatch, execute, completion, and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16. Typically the LSU 28 includes a cast out queue and a miss queue the function details of which will be discussed hereinafter.

The processor 10 includes a number of stages, such as the following, in the processor pipeline. In a typical first stage, referred to as an instruction fetch stage, an instruction is fetched from memory. Then, in decode stage, the instruction is decoded into different control bits, which in general designate i) a type of functional unit for performing the operation specified by the instruction, ii) source operands for the operation and iii) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

Figure 2:
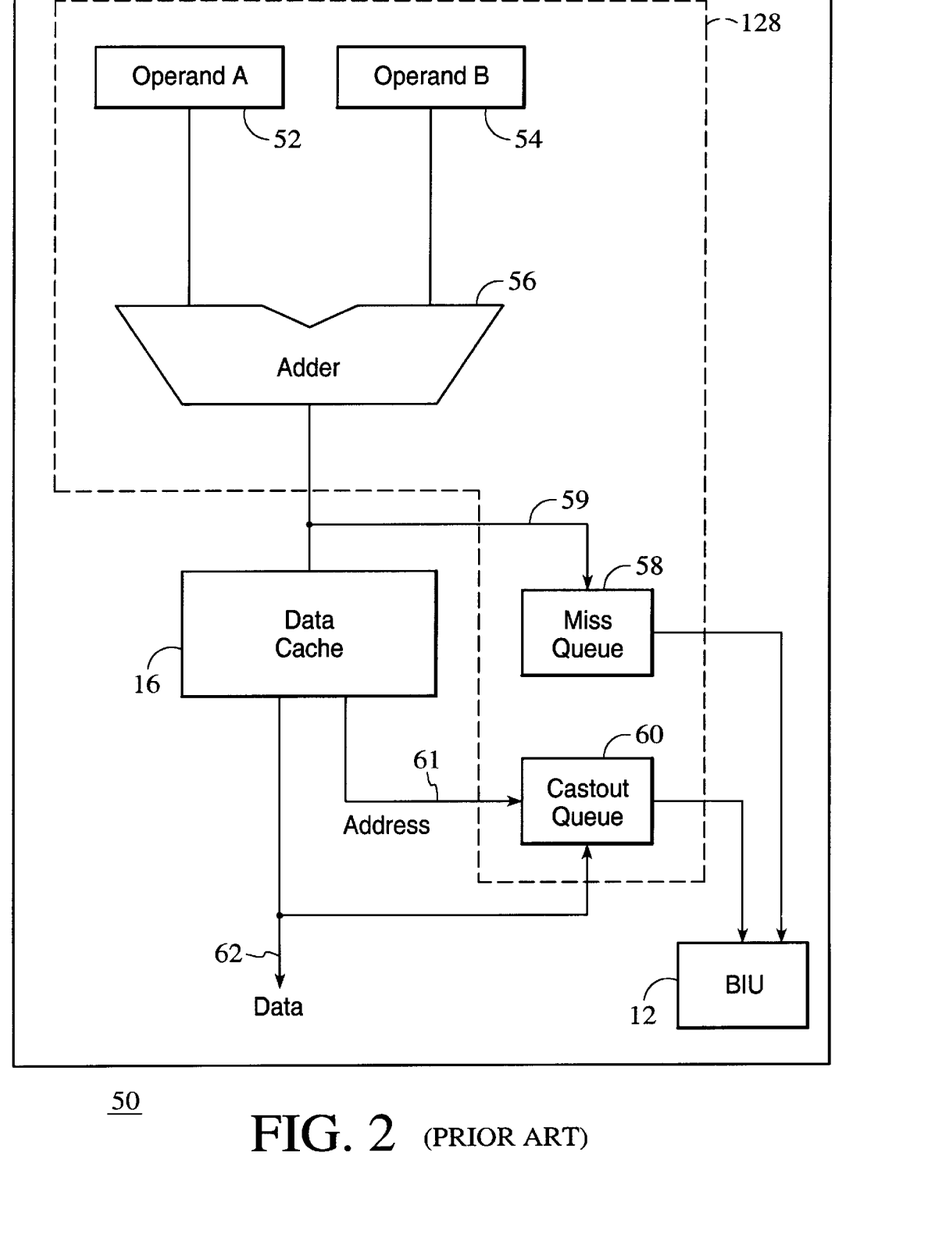
FIG. 2 is a block diagram of a conventional system for generating an address.

FIG. 2 is a block diagram of a conventional system 50 for performing an address generation and a first level cache access for a storage reference instruction, This system 50 which is an expanded subset of processor 10 of FIG. 1 includes the loadstore unit (LSU) 28, the data cache 16 and the bus interface unit 12. The effective address is generated by adder 56 of the LSU 28. The inputs to the adder 56 are Operand A 52 and Operand B 54 of the LSU 28. After the effective address 59 is generated by adder 56, the address is translated, the appropriate address 61 in the data cache 16 can be accessed, data 62 is made available, and the instruction completes.

Although the conventional system 50 shown in FIG. 2 functions when all steps for a storage reference instruction can be completed, those with ordinary skill in the art will realize that the conventional system cannot account for delays in execution of the instruction.

Execution of an instruction can be delayed for a variety of reasons. Different instructions may also take different amounts of time to complete. One instruction may require an unusually large number of cycles to complete and may occur infrequently. Because the conventional system 30 cannot adjust to the time required to complete the instruction, the processor must be designed so that it can always execute the longest instruction. The processor's performance will be diminished.

The time to perform address translation and cache access steps can vary dramatically. For example, a cache miss, or a translation miss (which affects translation availability)

may delay execution. Cache misses may affect data availability times. In addition, in a particular processor, there may be different requirements for executing an instruction depending on whether the cache is hit or missed. For example, the miss-queue 58 and/or cast out queue 60 are required for a cache miss in the particular processor 10. Thus, the requirements for executing an instruction may not even be determined until after the cache has been either hit or missed. There may also be a translation miss which affects the time in which the processor can confirm whether the cache access has been hit or missed. In addition, the results of the address generation may affect whether more than one cache access is required for unaligned references.

Although other conventional systems can account for some differences in the time required to execute an instruction, such systems employ a variety of components to do so, depending on the type of delay. For example, in a storage reference instruction, some delays due to address translation and cache accesses may be accounted for by storing the address in a special register prior to the adder 56 in FIG. 2, and incrementing the address. However, this does not account for all expansions in the time required to implement an instruction. Other components, such as a register at the cache, must also be provided. Thus, even in conventional systems which can account for some delays in execution of the instruction, this function was split among multiple components.

The present invention provides for a method and system for providing dynamic processor pipeline expansion for execution of an instruction. In particular, the present invention provides a method and system for reexecution of at least a portion of an instruction to account for delays in completing the instruction. The present invention will be described in terms of a system for providing dynamic expansion of a pipeline for execution of a storage reference instruction, particularly the address generation step, in a superscalar processor. However, one of ordinary skill in the art will readily recognize that this method and system will operate effectively for other steps, other instructions, and other environments.

Figure 3:
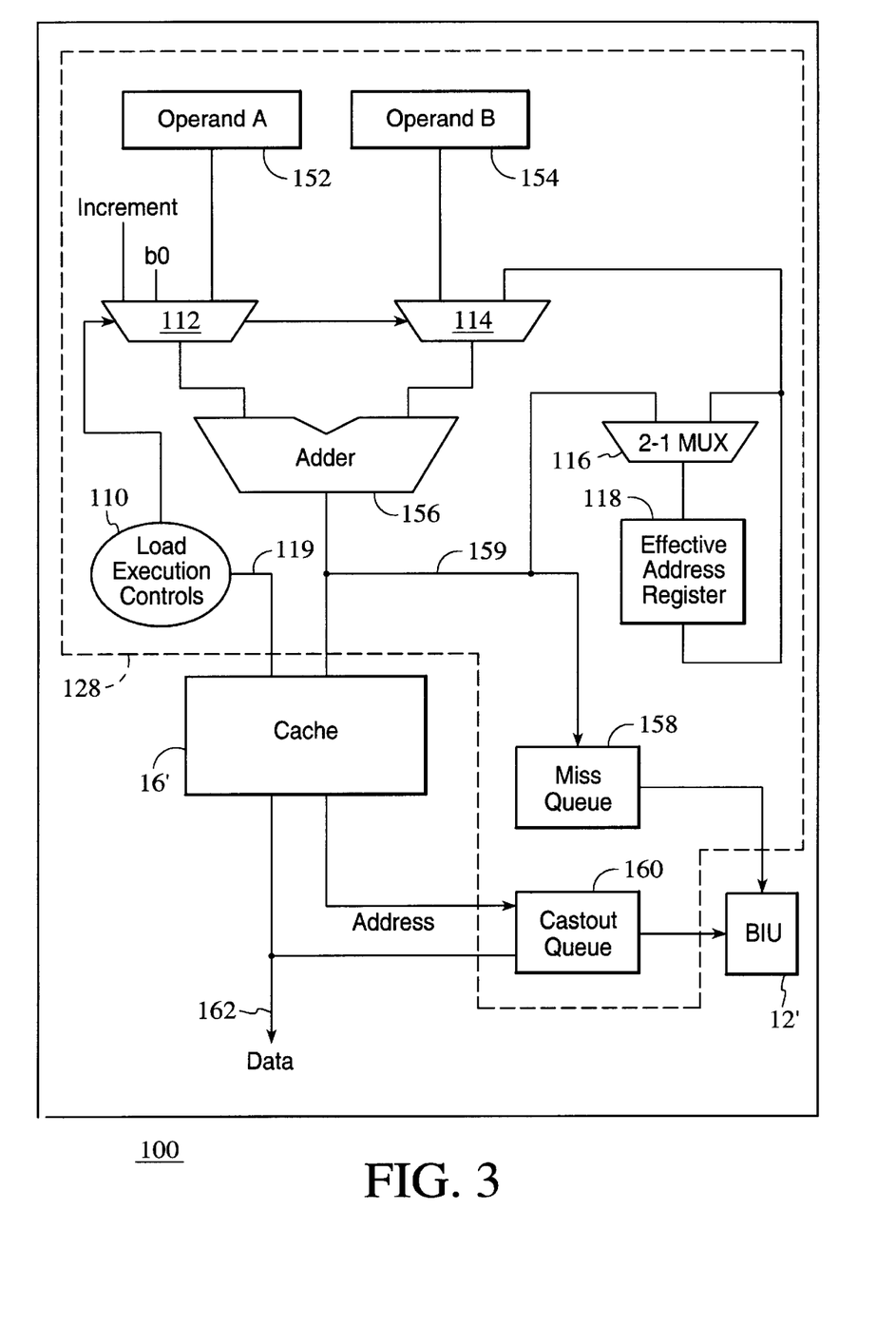
FIG. 3 a block diagram of one embodiment of a system for providing dynamic expansion of a system for generating an address.

To more particularly illustrate the method and system in accordance with the present invention, refer now to FIG. 3, depicting a block diagram of one embodiment of a system 100 for performing the address generation and first level cache access for a storage reference instruction. The system 100 contains many components such as the data cache 16' and the BIU 12' similar to the conventional system of FIG. 2. In addition some of the elements of the LSU 28 of FIG. 2 are similar to those shown in LSU 128 of FIG. 3. These components have labels that are similar to the labels in FIG. 2. For example, the adder 156 of LSU 128 of FIG. 3 corresponds to the adder 56 of the LSU 28 of FIG. 2.

Referring now to FIG. 3, the system 100 includes load execution controls 110 and MUXs 112 and 114 for allowing for the execution of an instruction. The executing instruction specifies an address in memory. When generating the address specified by the instruction, the system 100 functions similarly to system 30 of FIG. 2. The load execution controls 110 allows MUXs 112 and 114 to provide the input to the adder 156 for generation of an address. After the address is generated, it is stored in effective address register 118. In normal operation, like system 100 the address is translated, the data cache 16' returns data and the instruction completes.

There are times, however, when data cannot be accessed within the cache 16'. One reason may be that the data cache 16' was accessed and no data was found. Another reason may be that the cache 16' cannot be addressed due to a translation miss. If for either of these or other reasons the data within the data cache 16' cannot be accessed based upon the state of a control signal 119 to the load execution controls 110 from the cache 16', the load execution controls 110 reinput the address stored in the effective address register to the MUX 114. MUXs 112 and 114 then provide inputs to adder 156 for recalculation of a new effective address. In the embodiment shown in FIG. 3, the new effective address is latched into effective address register 118 and provided to the data cache 16'.

The process described above is repeated until the cache 16' returns data and the instruction can be completed. Thus, the system 100 dynamically extends the pipeline for execution of the instruction by reexecuting the instruction when necessary to account for delays. As a result, the system 100 extends the pipeline only as long as necessary to complete the instruction.

Regardless of whether or not an instruction is reexecuted, the instruction is always latched to the EA register 118 at the end of the cycle, making available the Operand A 152 and B 154 latches for a subsequent instruction. As a result, the peak instruction throughput can be achieved when dynamic pipeline expansion is not required and the decision between the reexecuting of an instruction in the EA 118 register or executing a new operation from Operand A 152 and B 154 latches can be delayed until the end of the current cycle.

For example, if it is determined after a cache access there is a cache miss or translation miss and the miss queue or the cast out queue 160 is full, the operation can, due to the selectability, simply be reexecuted until there is room in the miss queue 158 or cast out queue 160. Without the dynamic pipeline expansion of the present invention, this case was typically handled by stalling all loads (cache hits or misses) if the miss queue 158 and/or the cast out queue 160 was full.

Similarly, byte overlap (which depends upon translation) between loads and stores is often detected at the end of the cycle. The late selectability of pipeline expansion allows the pipeline to be either expanded when the load needs data from the store, or remain collapsed when the load can progress normally and a subsequent instruction can be executed. Finally, certain instructions such as string instructions utilize an implicit operand length which may not be known until execution. Dynamic pipeline expansion allows for the handling of this variable cycle operation.

A step in executing a load instruction includes (1) accessing by an execution unit, such as the LSU 28, information specified by the load instruction, wherein the information is accessed, for example, in a cache associated with the execution unit, or else, (2) in the event of a delay in returning the specified information due to a cache miss, passing the address of the specified information for entry into the miss queue 158. A cache miss will typically require a bus access and another unit (such as the bus interface unit 12' or a memory subsystem unit (not shown)) arbitrates among the request and other requests, such as other requests in the miss queue 158 or cast out queue 160, for information which similarly require bus access, and obtains the specified information.

In one alternative system and method which does not provide all the features and advantages of the preferred embodiment herein disclosed, before a storage access instruction is issued to the LSU 128, one or more such miss or castout queues are checked to determine if there is currently space to permit receiving an entry, so that, for example, if execution of the instruction generates a cache miss the execution unit can pass along the address of the requested information to the cache miss queue. If this checking determines that there is no space in the miss or castout queue, then the load instruction will not be issued to the LSU 128 and the processing of such storage access instructions will be stalled until an entry in the miss or castout queue becomes available as a result, for example, of processing by the bus interface unit 12'. It should be appreciated that the alternative system and method issues a storage access instruction to the execution unit in response to space availability in the miss queue 158 or cast out queue 160, even though the instruction might not generate a cache miss, and hence space in the miss queue 158 or the cast out queue 160 may not be required.

In the preferred embodiment, such a storage access instruction is issued independently of availability of space in the miss queue 158 or cast out queue 160, thus avoiding needless delay in issuing the instruction to the execution unit for the case where executing the instruction does not generate a cache miss. If executing the instruction does result in a cache miss, the dynamic expansion of the pipeline stages affords additional time during the instruction's execution for the miss queue space to become available. Thus, in the preferred system and method determination of miss queue 158 or the cast out queue 160 availability is delayed until it is determined that the space is actually needed, and it is only in this instance that processing proceeds in response to unavailability of miss queue space, i.e., the instruction is re-executed in the execution unit, as described above in connection with FIG. 3.

A method and system has been disclosed for dynamically extending execution of an instruction to account for delays in completion of the instruction. Note that this system can be used to account for unexpected delays and for instructions that are known to take a longer time to execute. The method and system account for delays by reexecuting at least a portion of the instruction.

Because the instruction is reexecuted, the method and system are particularly useful in processors employing a plurality of execution units. For example, load store unit 28 of FIG. 1 may itself employ a plurality of load/store execution units. The method and system are particularly useful in such a processor because where a plurality of execution units are employed, reexecution of an instruction is less likely to delay completion of other steps or other instructions. However, this does not prevent use of the method and system in a processor employing a single execution unit.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system in a data processing system for accessing information using an instruction specifying a specified address in memory, the system comprising;
   means for issuing the instruction to an execution unit;
   means for calculating an address from the specified address;
   means, coupled to the calculating means, for storing the address derived from me specified address and for inputting the address to the calculating means to recalculate the address if the information a cache cannot be obtained from a cache;
   means for accessing the cache to obtain the information using the address derived from the specified address;
   means for determining, in response to a signal indicating that there has been a cache miss, if there has been a cache miss, if there is a location available to store the specified address in a first queue; and
   means for reaccessing the cache if additional accesses are required for conditions other than a cache miss, and wherein the other conditions include a translation miss and an unaligned access.

2. The system of claim 1 in which the determining means comprises means for determining, in response to a signal indicating that both a cache miss has occurred and a line selected for replacement is dirty, if there is a location available to store the data and address for the line being replaced in the second queue.

3. The system of claim 1 in which the second queue comprises a cast out queue.

4. The system of claim 1 in which the first queue comprises a miss queue.

5. The system of claim 4 in which the means for reaccessing the cache further includes:
   means for using the stored address in response to determining that the miss queue is full.

6. The system of claim 4 wherein the issuing of the instruction to the execution unit is independent of whether the miss queue is full.

7. The system of claim 4 which includes:
   means for reaccessing the cache if the miss queue is full and the information cannot be obtained from the cache.

8. The system of claim 1 wherein the storing of the address is in a register associated with the execution unit.

9. The system of claim 1 wherein the storing means store the address whether or not the information in the cache can be accessed.

10. A system in a data processing system for accessing information using an instruction specifing a specified address in memory, the system comprising:
    means for issuing the instruction to an execution unit;
    means for calculating an address from the specified address;
    means, coupled to the calculating means, for storing the address derived from the specified address and for inputting the address to the calculating means to recalculate the address if the information a cache cannot be obtained;
    means for accessing the cache to obtain the information using the address derived from the specified address;
    means for determining, in response to a signal indicating that there has been a cache miss, if there has been a cache miss, if there is a location available to store the specified address in a first queue, the determining means further determining, in response to a signal indicating that both a cache miss has occurred and line selected for replacement is dirty, if there is a location available to store the data and address for the line being replaced in a second queue, the second queue being a cast out queue; and
    means for reaccessing the cache, using the stored address in response to a cache miss occurring and in response to determining that the cast out queue is full.

11. A system in a data processing system for accessing information using an instruction specifing a specified address in memory, the system comprising:

means for issuing the instruction to an execution unit;

means for calculating an address from the specified address;

means, coupled to the calculating means, for storing the address derived from the specified address and for inputting the address to the calculating means to recalculate the address if the information a cache cannot be obtained;

means for accessing the cache to obtain the information using the address derived from the specified address;

means for determining, in response to a signal indicating that there has been a cache miss, if there has been a cache miss, if there is a location available to store the specified address in a first queue, the determining means further determining, in response to a signal indicating that both a cache miss has occurred and a line selected for replacement is dirty, if there is a location available to store the data and address for the line being replaced in a second queue, the second queue being a cast out queue; and means for reaccessing the cache using the stored address in response to a cache miss occurring, a cast out operation occurring and the cast out queue being fill.

12. A system in a data processing system for accessing information using an instruction specifying a specified address in memory, the system comprising:

means for issuing the instruction to an execution unit;

means for calculating an address from the specified address;

means, coupled to the calculating means, for storing the address derived from the specified address and for inputting the address to the calculating means to recalculate the address if the information a cache cannot be obtained;

means for accessing the cache to obtain the information using the address derived from the specified address;

means for determining, in response to a signal indicating that there has been a cache miss, if there has been a cache miss, if there is a location available to store the specified address in a first queue, the determining means further determining, in response to a signal indicating that both a cache miss has occurred and a line selected for replacement is dirty, if there is a location available to store the data and address for the line being replaced in a second queue, the second queue being a cast out queue; and means for reaccessing the cache using the stored address in response to a cache miss occurring, a cast out entry being required and the cast out queue being full.

13. A system in a data processing system for accessing information using an instruction specifying a specified address in memory, the system comprising:

means for issuing the instruction to an execution unit;

means for calculating an address from the specified address;

means, coupled to the calculating means, for storing the address derived from the specified address and for inputting the address to the calculating means to recalculate the address if the information a cache cannot be obtained;

means for accessing the cache to obtain the information using the address derived from the specified address;

means for determining, in response to a signal indicating that there has been a cache miss, if there has been a cache miss, if there is a location available to store the specified address in a first queue, the determining means further determining, in response to a signal indicating that both a cache miss has occurred and a line selected for replacement is dirty, if there is a location available to store the data and address for the line being replaced in a second queue, the second queue being a cast out queue; and means for reaccessing the cache, using the stored address in response to determining that the cast out queue is full.

14. A system in a data processing system for accessing information using an instruction specifying a specified address in memory, the system comprising:

means for issuing the instruction to an execution unit;

means for calculating an address from the specified address;

means, coupled to the calculating means, for storing the address derived from the specified address and for inputting the address to the calculating means to recalculate the address if the information a cache cannot be obtained;

means for accessing the cache to obtain the information using the address derived from the specified address;

means for determining, in response to a signal indicating that there has been a cache miss, if there has been a cache miss, if there is a location available to store the specified address in a first queue, the determining means further determining, in response to a signal indicating that both a cache miss has occurred and a line selected for replacement is dirty, if there is a location available to store the data and address for the line being replaced in a second queue, the second queue being a cast out queue; and wherein the issuing of the instruction to the execution unit is independent of whether the cast out queue is full.

15. A system in a data processing system for accessing information using an instruction specifying a specified address in memory, the system comprising:

means for issuing the instruction to an execution unit;

means for calculating an address from the specified address;

means, coupled to the calculating means, for storing the address derived from the specified address and for inputting the address to the calculating means to recalculate the address if the information a cache cannot be obtained;

means for accessing the cache to obtain the information using the address derived from the specified address;

means for determining, in response to a signal indicating that there has been a cache miss, if there has been a cache miss, if there is a location available to store the specified address in a first queue, the determining means further determining, in response to a signal in dictating that both a cache miss has occurred and a line selected for replacement is dirty, if there is a location available to store the data and address for the line being replaced in a second queue, the second queue being a cast out queue; and means for reaccessing the cache if the cast out queue is full and the information cannot be obtained from the cache.

16. A method in a data processing system for accessing information using an instruction specifying a specified address in memory, the method comprising the steps of:

(a) issuing the instruction to an execution unit, the step of issuing the instruction being independent of whether a miss queue is full;

(b) calculating an address from the specified address;

(c) storing the address derived from the specified address in a register;

(d) accessing a cache to obtain the information, using the address derived from the specified address;

(e) determining, in response to a signal indicating that there has been a cache miss, if there is a location available to store the specified address in a first queue, the first queue including the miss queue;

(f) recalculating the address using the address as an input if the information cannot be obtained from the cache; and (g) reaccessing the cache if the miss queue if full.

17. The method of claim 1 in which step (e) comprises the step of determining, in response to a signal indicating that both a cache miss has occurred and a line selected for replacement is dirty, if there is a location available to store the data and address for the line being replaced in the second queue.

18. The method of claim 17 in which the second queue comprises a cast out queue.

19. The method of claim 1 in which the method which includes the steps of:

re-accessing the cache if additional accesses are required for conditions other than a cache miss.

20. The method of claim 1 wherein the storing step (c) is performed whether or not the information in the cache can be accessed.

21. A method in a data processing system for accessing information using an instruction specifying a specified address in memory, the method comprising the steps of:

(a) issuing the instruction to an execution unit;

(b) calculating an address from the specified address;

(c) storing the address derived from the specified address;

(d) accessing a cache to obtain the information, using the address derived from the specified address;

(e) determining, in response to a signal indicating that there has been a cache miss, if there is a location available to store the specified address in a first queue, the determining step further including determining, in response to a signal indicating that both a cache miss has occurred and a line selected for replacement is dirty, if there is a location available to store the data and address for the line being replaced in a second queue, the second queue being a cast out queue;

(f) recalculating the address using the address as an input if the information cannot be obtained from the cache; and (g) reaccessing the cache, using the stored address in response to a cache miss occurring and in response to determining that the cast out queue is full.

22. A method in a data processing system for accessing information using an instruction specifying a specified address in memory, the method comprising the steps of:

(a) issuing the instruction to an execution unit;

(b) calculating an address from the specified address;

(c) storing the address derived from the specified address;

(d) accessing a cache to obtain the information, using the address derived from the specified address;

(e) determining, in response to a signal indicating that there has been a cache miss, if there is a location available to store the specified address in a first queue, the determining step further including determining, in response to a signal indicating that both a cache miss has occurred and a line selected for replacement is dirty, if there is a location available to store the data and address for the line being replaced in a second queue, the second queue being a cast out queue;

(f) recalculating the address using the address as an input if the information cannot be obtained from the cache; and (g) reaccessing the cache, using the stored address in response to a cache miss occurring, a cast operation occurring and the cast out queue being full.

23. A method in a data processing system for accessing information using an instruction specifying a specified address in memory, the method comprising the steps of:

(a) issuing the instruction to an execution unit;

(b) calculating an address from the specified address;

(c) storing the address derived from the specified address;

(d) accessing a cache to obtain the information, using the address derived from the specified address;

(e) determining, in response to a signal indicating that there has been a cache miss, if there is a location available to store the specified address in a first queue, the determining step further including determining, in response to a signal indicating that both a cache miss has occurred and line selected for replacement is dirty, if there is a location available to store the data and address for the line being replaced in a second queue, the second queue being a cast out queue; and (f) recalculating the address using the address as an input if the information cannot be obtained from the cache; and wherein in response to a cache miss occurring and a cast out entry is required and the cast out queue is full.

24. A method in a data processing system for accessing information using an instruction specifying a specified address in memory, the method comprising the steps of:

(a) issuing the instruction to an execution unit;

(b) calculating an address from the specified address;

(c) storing the address derived from the specified address;

(d) accessing a cache to obtain the information, using the address derived from the specified address;

(e) determining, in response to a signal indicating that there has been a cache miss, if there is a location available to store the specified address in a fist queue, the determining step further including determining, in response to a signal indicating that both a cache miss has occurred and a line selected for replacement is dirty, if there is a location available to store the data and address for the line being replaced in a second queue, the second queue being a cast out queue;

(f) recalculating the address using the address as an input if the information cannot be obtained from the cache; and (g) reaccessing the cache, using the stored address, in response to determining that the cast out queue is fill.

25. A method in a data processing system for accessing information using an instruction specifying a specified address in memory, the method comprising the steps of:

(a) issuing the instruction to an execution unit;

(b) calculating an address from the specified address;

(c) storing the address derived from the specified address;

(d) accessing a cache to obtain the information, using the address derived from the specified address;

(e) determining, in response to a signal indicating that there has been a cache miss, if there is a location available to store the specified address in a first queue, the determining step further including determining, in response to a signal indicating that both a cache miss has occurred and a line selected for replacement is dirty, if there is a location available to store the data and address for the line being replaced in a second queue, the second queue being a cast out queue; and (f) recalculating the address using the address as an input if the information cannot be obtained from the cache; and wherein the issuing of the instruction to the execution unit is independent of whether the cast out queue is fill.

26. The method of claim 24 wherein the address is stored in a register and in which the method includes the steps of:

re-accessing the cache if the cast out queue is full.

27. A method in a data processing system for accessing information using an instruction specifying a specified address in memory, the method comprising the steps of:

(a) issuing the instruction to an execution unit;

(b) calculating an address from the specified address;

(c) storing the address derived from the specified address in a register;

(d) accessing a cache to obtain the information, using the address derived from the specified address;

(e) determining, in response to a signal indicating that there has been a cache miss, if there is a location available to store the specified address in a first queue;

(f) recalculating the address using the address as an input if the information cannot be obtained from the cache; and (g) reaccessing the cache if additional accesses are required for conditions other than a cache miss and the information cannot be obtained from the cache, wherein the other conditions includes a translation miss and an unaligned access.

* * * * *